(12) United States Patent
Abdelhakim et al.

(10) Patent No.: US 11,962,244 B2
(45) Date of Patent: Apr. 16, 2024

(54) BUCK-ASSISTED SPLIT-SOURCE INVERTER

(71) Applicant: ABB Schweiz AG, Baden (CH)

(72) Inventors: Ahmed Abdelhakim, Västerås (SE); Cicero Postiglione, Västerås (SE); Arber Haxhiu, Helsinki (FI)

(73) Assignee: ABB Schweiz AG, Baden (CH)

( * ) Notice: Subject to any disclaimer, the term of this patent is extended or adjusted under 35 U.S.C. 154(b) by 7 days.

(21) Appl. No.: 18/048,804

(22) Filed: Oct. 21, 2022

(65) Prior Publication Data
US 2023/0125181 A1    Apr. 27, 2023

(30) Foreign Application Priority Data
Oct. 22, 2021  (EP) ...................... 21204184

(51) Int. Cl.
*H02M 3/158*  (2006.01)
*H02M 1/00*   (2006.01)
*H02M 7/5387* (2007.01)

(52) U.S. Cl.
CPC ....... *H02M 3/1582* (2013.01); *H02M 1/0058* (2021.05); *H02M 7/5387* (2013.01)

(58) Field of Classification Search
CPC ............ H02M 3/1582; H02M 1/0058; H02M 7/5387; H02M 3/158; H02M 1/00
See application file for complete search history.

(56) References Cited

FOREIGN PATENT DOCUMENTS

| DE | 102017201155 A1 | 7/2018 |
|----|-----------------|--------|
| WO | 2021104621 A1   | 6/2021 |

OTHER PUBLICATIONS

Abdelhakim, Ahmed, et al.; "Three-Phase Split-Source Inverter (SSI): Analysis and Modulation"; IEEE Transactions on Power Electronics, Institute of Electrical And Electronics Engineers, vol. 31, No. 11; USA; Nov. 1, 2016; 11 Pages.
Zhu, Jianxin, et al.; "A Dual-DC Output Three-Phase Three-Level AC-DC Converter for Low-Frequency Pulsed Power Decoupling Applications"; IEEE Transactions on Industrial Electronics, vol. 69, No. 1; IEEE Service Center, Piscataway, NJ, USA; Jan. 14, 2021; 12 Pages.
European Search Report; Application No. EP 21 20 4184; dated Mar. 24, 2022; 2 Pages.

*Primary Examiner* — Robert L Deberadinis
(74) *Attorney, Agent, or Firm* — Whitmyer IP Group LLC

(57) ABSTRACT

A buck-assisted split-source inverter including a DC link having two voltage rails, at least two pairs of series connected switches, a first connection point and a second connection point for receiving voltage terminals of a fuel cell, one of the two voltage rails forming the first connection point, a switch component and an inductor connected in series having a first end formed of a terminal of the switch component and a second end formed of a terminal of the inductor, the first end forming the second connection point for receiving a voltage terminal of a fuel cell. The inverter further including at least two first diodes, a second diode having first and second terminals, wherein the switch component is adapted to be controlled conductive when any one of the lower switches connected to voltage rail forming the first connection point is controlled conductive.

15 Claims, 3 Drawing Sheets

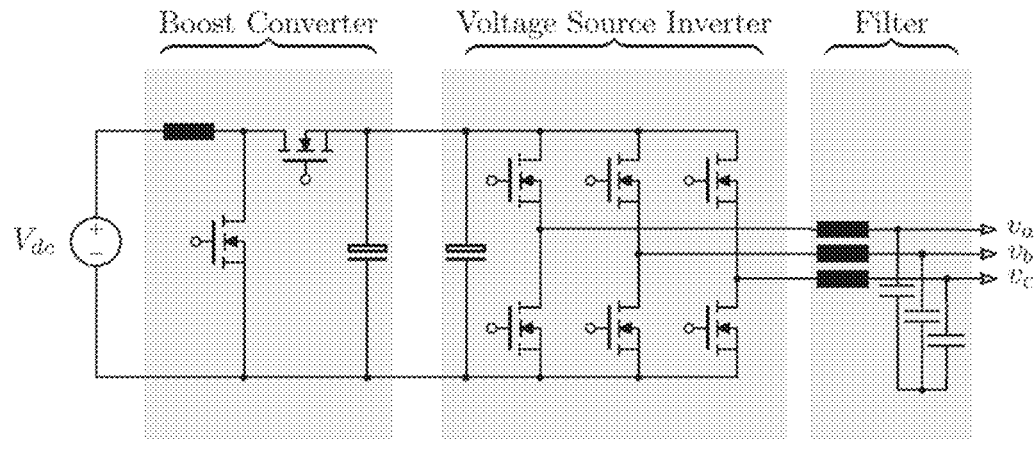
FIG 1 --Prior Art--
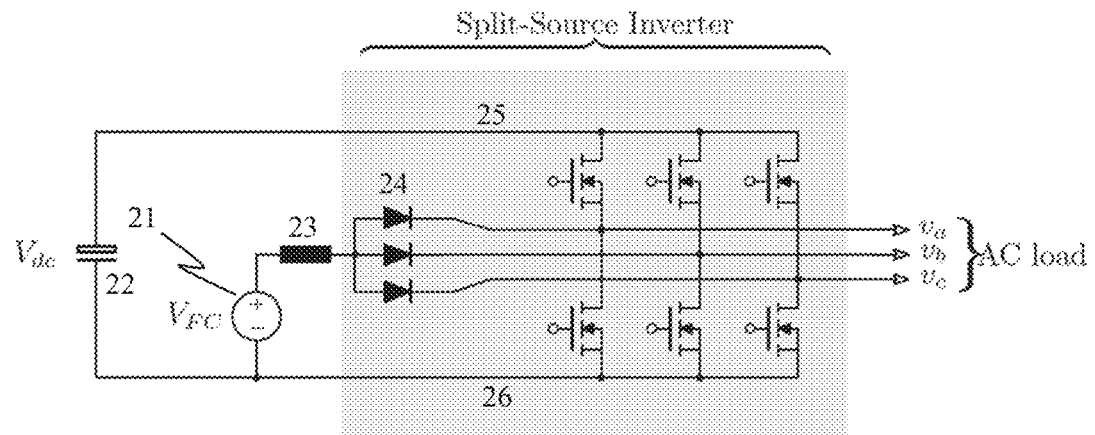
FIG 2 --Prior Art--
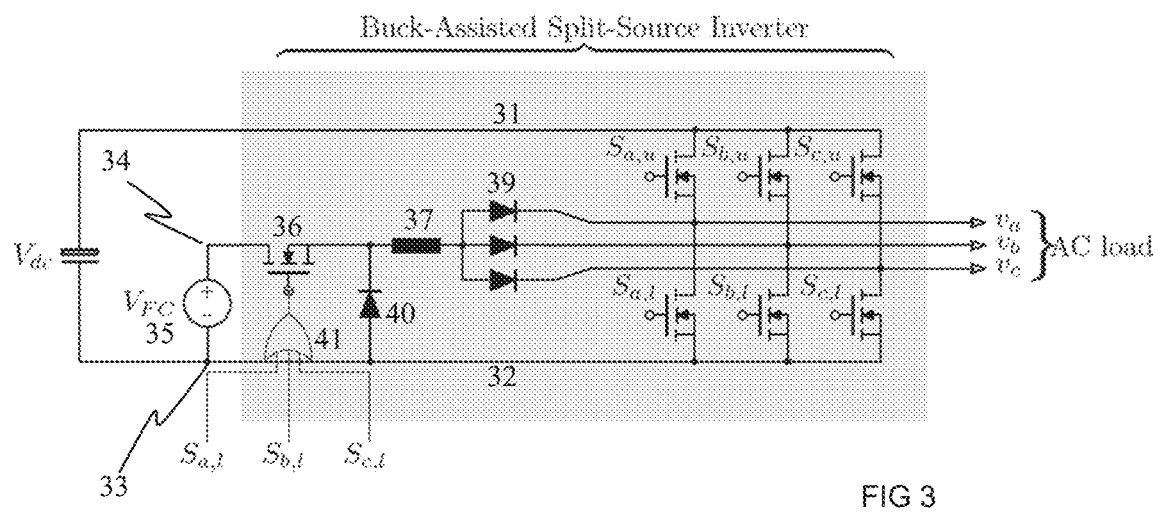
FIG 3

BUCK-ASSISTED SPLIT-SOURCE INVERTER

TECHNICAL FIELD

The present invention relates to an inverter, and particularly to a split-source inverter having a fuel cell as a source of energy.

BACKGROUND

The integration of low-voltage (LV) energy sources, such as photovoltaic (PV) and fuel cell (FC), to the ac grids has been a relevant topic for research over the past few years. On top of that, integrating these energy sources with medium-voltage (MV) grids is gaining higher attention, due to the seen merits behind the MV integration at higher power levels. PV applications usually stack solar panels to achieve voltages up to 1.5 kV, however, the same is not true for FC that still have limitations in output voltage, where the highest voltage range seen in the market is 400~700V. Therefore, the integration of FC to LV or MV grid requires the use of a step-up dc-dc converter and an inverter to connect it to the AC grid, where a high step-up converter or transformer is a must with the MV grid.

In general, FC systems require a two-stage power conditioning stage, where a DC-DC converter is utilized before the DC-AC converter in order to achieve the right voltage levels for either LV or MV AC grid integration as shown in FIG. 1. On top of that, an isolating or step-up transformer can be utilized.

Another approach is to utilize a single-stage solution, such as the split-source inverter (SSI) shown in FIG. 2, in which the boosting capability is integrated within the inversion operation. This integrated solution uses the inverter switches with the addition diodes connected to a common inductor to achieve the boosting properties, i.e. it avoids the utilization of extra active switches and gate drive circuits. The operation of the SSI is described in A. Abdelhakim, P. Mattavelli and G. Spiazzi, "Three-Phase Split-Source Inverter (SSI): Analysis and Modulation," in IEEE Transactions on Power Electronics, vol. 31, no. 11, pp. 7451-7461, November 2016. This inverter uses at least one of the lower semiconductor switches to charge the input inductor, while using only one state to discharge this inductor over the inverter dc-link when all the upper switches are ON. The operation of the three-phase SSI does not require any special pulses to be generated or modifications of the standard modulation schemes of the voltage source inverter (VSI) for its basic operation. Hence, the same modulation schemes of the VSI can be applied to the SSI.

When SSI topology is employed with voltage sources, such as fuel cells, it is important that the utilization of the available voltage is as high as possible.

SUMMARY

An object of the present invention is to provide a buck-assisted spa-n source converter so as to alleviate the above disadvantage relating to utilization of the voltage. The object of the invention is achieved by an inverter circuit which is characterized by what is stated in the independent claim. The preferred embodiments of the invention are disclosed in the dependent claims.

The invention is based on the idea of modifying the configuration of the SSI circuit with minimum amount of additional components and without affecting the modulation of the inverter circuit.

With the circuit of the invention voltage stresses of the inverter switch components are reduced and at the same time DC-link utilization is increased when compared to known SSI configuration. These advantages together with standard modulation of the inverter lead to a structure which is more efficient in use. Especially in connection with low voltage sources, such as fuel cells, the circuit of the invention provides efficient DC to AC conversion.

BRIEF DESCRIPTION OF THE DRAWINGS

In the following the invention will be described in greater detail by means of preferred embodiments with reference to the attached drawings, in which FIG. 1 shows a conventional fuel cell integration with AC loads;

FIG. 2 shows a known split-source inverter structure for fuel cell integration with AC loads; and FIGS. 3, 4, 5, 6 and 7 show embodiments of a buck-assisted split-source inverter of the invention.

DETAILED DESCRIPTION

Figure 4:
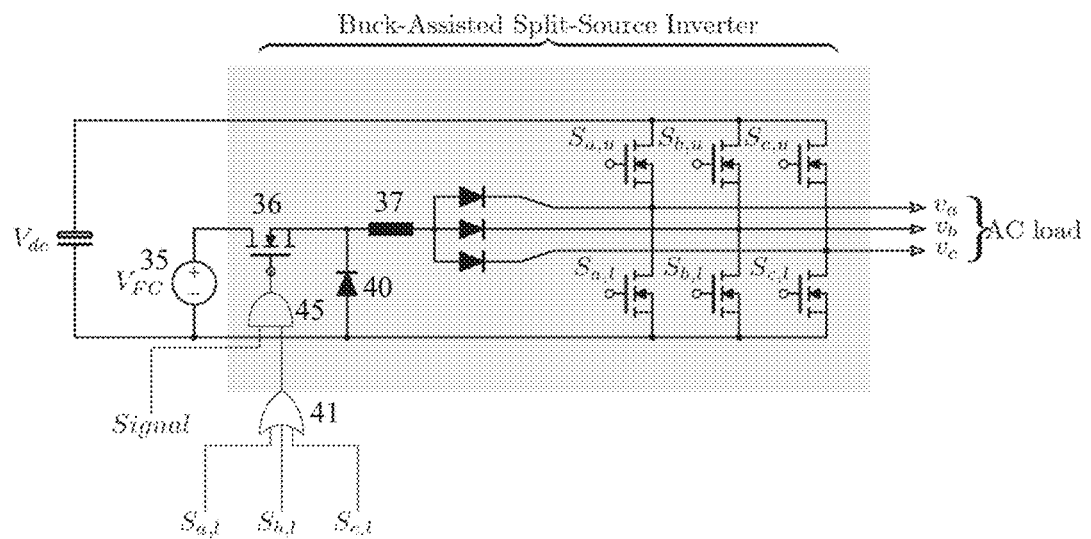

FIG. 1 shows a configuration for feeding electrical energy to a grid from a fuel cell. In the configuration a DC voltage $V_{dc}$ from a voltage source, such as a fuel cell, is first boosted with a boost converter. In the second stage the boosted voltage is inverted with a voltage source inverter to a three phase AC voltage. When feeding the voltage to the grid, a filter is also applied to smooth the voltage generated by the inverter.

FIG. 2 shows a known split-source inverter with a fuel cell 21. A split source inverter has a voltage source inverter bridge which is connected between the voltage of a DC link. DC link of FIG. 2 has a capacitor 22 to sustain the voltage of the DC link. The voltage of the DC link is used to produce alternating voltage using the switches of the inverter bridge.

In a split-source inverter as shown in FIG. 2, a voltage from a voltage source 21 is boosted using the switch components of the inverter and an additional inductor 23. Further, additional diodes 24 are needed such that the DC link is not shorted. Although the operation of the split-source inverter of FIG. 2 is known as such, the following description of operation is provided.

In the example of FIG. 2, a fuel cell is provided as a voltage source 21 having voltage $V_{FC}$. The inverter bridge, formed of three parallel inverter legs, are modulated such that either upper or lower semiconductor switch of a phase is active. That is, the output voltages $v_a$, $v_b$, $v_c$ are formed of voltages of DC link using the upper or lower semiconductor switches. The upper switches are connected to positive rail 25 of the DC link and the lower switches are connected to negative rail 26 of the DC link.

When the switches of the inverter bridge are modulated, current from the fuel cell 21 is flowing. When any of the lower switch components are conducting, the inductor 23 is charged from the voltage source 21. That is, a current path is formed from the voltage source through the inductor 23, the conducting switch and corresponding diode to the negative rail 26 of the DC link and back to source 21. When one or more of the lower switch components are conductive, the voltage of the capacitor is lowered as current to the load is provided through the active upper switches.

When during the modulation of the switches of the inverter a state in which all the upper switches are conductive is selected, the inductor is discharged and pushes current through the switch components to the capacitor 22, and thereby charges the capacitor. Such a state is typically reached during normal modulation scheme, and additional measures to charge the capacitor are not required.

In a split-source inverter the voltage of the voltage source 21 is effectively boosted with the switch components of the inverter bridge during modulation of the switch components.

FIG. 3 shows a main circuit of the present invention. The buck-assisted split-source inverter comprising a DC link having two voltage rails 31, 32 and at least two pairs of series connected switches with antiparallel connected diodes between the rails of the DC link, the center points of the series connected switches forming the phase outputs of the inverter In FIG. 3 a three-phase inverter bridge is shown having upper switch components $S_{a,u}$, $S_{b,u}$, $S_{c,u}$ and lower switch components $S_{a,l}$, $S_{b,l}$, $S_{c,l}$. It is to be noted, that each switch component of the inverter bridge has also a parallel connected diode to enable flow of current to both directions. The center points of the switches form phase outputs of the inverter. The output voltages being denoted as $v_a$, $v_b$, and $v_c$.

Further, according to the invention, the buck-assisted split-source inverter comprises a first connection point 33 and a second connection point 34 for receiving voltage terminals of a fuel cell, one of the two voltage rails forming the first connection point 33. In FIG. 3, the buck-assisted split-source inverter is shown with a fuel cell 35 connected to the circuit. The connection points 33, 34 are provided in the circuit for receiving the fuel cells and are thus terminals for connecting voltage outputs of a fuel cell.

In the embodiment of FIG. 3, the first connecting point is shown to be the DC voltage rail 32, which is the negative voltage rail of the DC link. In another embodiment discussed below, the first connecting point is the positive voltage rail 31.

As shown in FIG. 3, the buck-assisted split-source inverter comprises further a switch component 36 and an inductor 37 connected in series. The series connection has a first end formed of a terminal of the switch component 36 and a second end formed of a terminal of the inductor 37 The first end of the series connection forms the second connection point 34 for receiving a voltage terminal of a fuel cell.

Further, the inverter of the invention comprises at least two first diodes 39 having one of their corresponding terminals connected together and to the second end of the series connection of the switch component and the inductor. The other terminals of the at least two first diodes 39 being connected to separate phase outputs of the inverter. FIG. 3 shows an embodiment with three phases and therefore also three first diodes 39. The diodes are connected such that their anodes are connected to the inductor, allowing current to pass from the inductor towards the inverter bridge.

FIG. 3 further shows a second diode 40 having first and second terminals, the first terminal being connected to the point between the switch component 36 and the inductor 37. The second terminal of the second diode 40 connected to the voltage rail 32 forming the first connection point 33, the polarity of the second diode corresponding to the polarities of the at least two first diodes such that a current path is formed through the second diode and the at least two first diodes. The polarity of the diode blocks the voltage of the point between the switch component 36. The switch component 36 of the invention is adapted to be controlled conductive when any one of the switches connected to voltage rail forming the first connection point 33 is controlled conductive. In the embodiment of FIG. 3, when any one of the lower switches $S_{a,l}$, $S_{b,l}$, $S_{a,l}$ is controlled conductive, the switch component 36 is also controlled conductive. In FIG. 3, this is shown as an OR circuit 41 which receives control signals of the lower switches and outputs the logical OR of the inputted signals as a control signal for the switch component 36.

When comparing FIGS. 2 and 3, it can be seen that the circuit of the invention differs from the known structure in that it comprises the switch component 36 and the second diode 40. The operation of the circuit of the invention corresponds to the known structure except that the switch component 36 is controlled conductive when any of the switches connected to the first connection point is controlled conductive. Generally, a three phase inverter can produce eight different switching states which may also be called output voltage vectors. From these states two are zero states in which either all of the upper switches or all of the lower switches are conductive, and the voltage between the output phases of the inverter is zero. In connection with the embodiment of FIG. 3, when all the upper switches are controlled conductive, the current from the inductor 37 is pushed through the upper switch components to charge the DC link. According to the embodiment, as none of the semiconductor switches connected to the first connection point are conducting, the switch component 36 is also not conducting, and the current flows through the second diode 40.

Due to the utilization of the switch component 36 with the inverter bridge, the voltage conversion gain can be further modified due to the extra degree of freedom in modulating the switch component 36. This can result in reduced voltage stresses across the DC-link in order to obtain the same AC voltage.

FIG. 4 shows another embodiment of the invention. In the embodiment the control of the switch 36 is affected by an additional control signal Signal. An AND gate 45 is shown to provide control to the switch 36, and the inputs to the AND gate are the additional control signal and the output of an OR gate 41. The OR gate receives control information from the lower switches similarly as in connection with the embodiment of FIG. 3. In other words, in the embodiment of FIG. 4, the switch component 36 is controlled conductive if anyone of the lower switch components are controlled conductive and if the additional control signal is in a logical high state.

With the control signal Signal, the switch component 36 can be set in a blocking state although one of the lower switches is controlled conductive. When the control signal is kept active, the control information from the lower semiconductor switches is passed to the switch component. With the control signal the switch 36 can be controlled to a blocking state. As described above, the current path through the lower switch components charge the inductor 37 from the voltage of the fuel cell 35. If the current path from the fuel cell is opened with the switch component when current is flowing through the lower semiconductor switches, the current path is changed to the diode 40, and the current is being pushed from the inductor 37. As the inductor is discharged through the diode 40, the energy for the next charging cycle of the DC link is reduced. The additional signal Signal enables therefore to lower the DC link voltage. The lowering of the DC link voltage may lead to higher utilization of the DC link voltage as a higher modulation index can be employed in the control of the inverter bridge.

In the embodiments of FIG. 3 and FIG. 4, the voltage of the DC voltage link is supported by capacitor 42 which is charged during the operation from the fuel cell.

Figure 5:
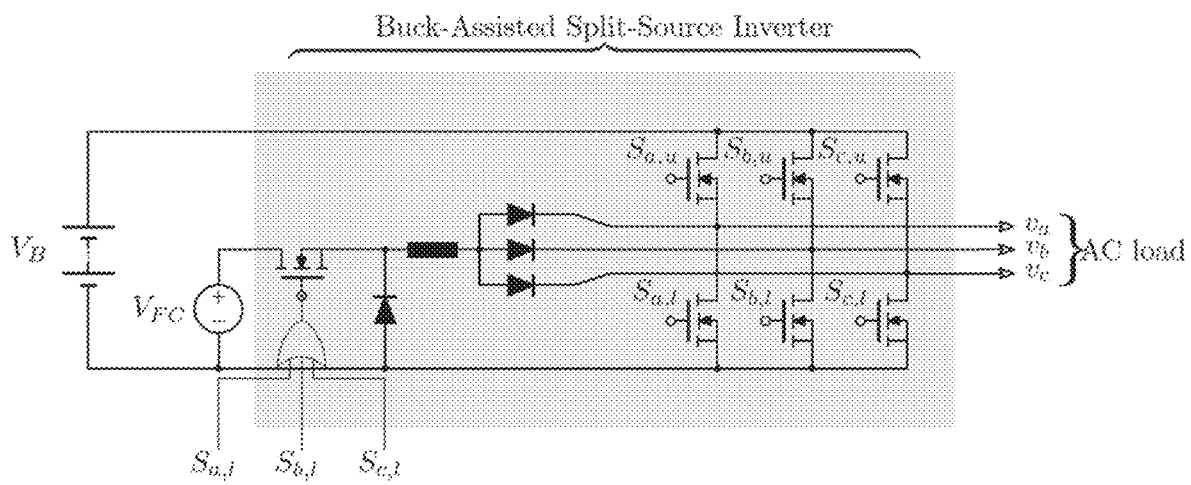

FIG. 5 shows another embodiment, in which a battery or a battery unit is connected to the DC link. During operation, the battery is charged and discharged.

Figure 6:
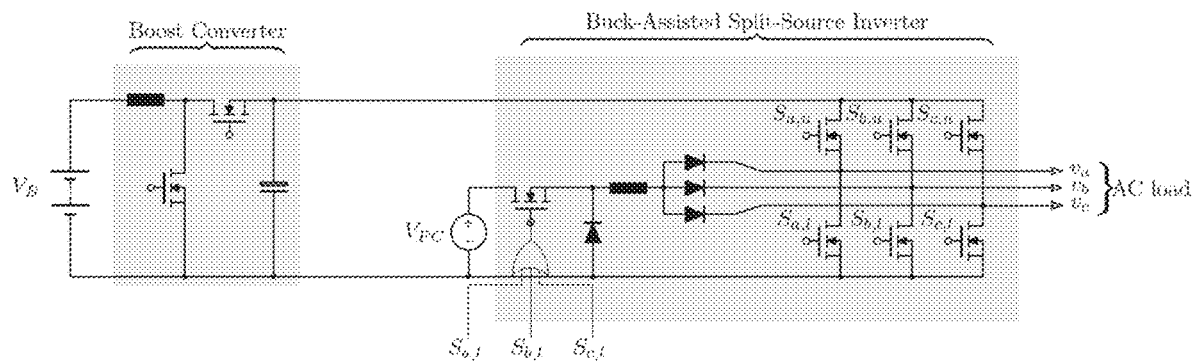

FIG. 6 shows another embodiment of the invention. In this embodiment, a separate boost converter is connected to the DC link. Voltage to the boost converter is obtained from a battery or a battery unit. The boost converter is operated in a known manner to control the voltage of the DC link. Preferably, the boost converter is operated such that a fixed DC voltage is obtained in the DC link. Instead of the battery or battery unit, in one embodiment, the DC link voltage is sustained using a supercapacitor. In such embodiment, the battery or battery unit of FIG. 6 is replaced with a supercapacitor.

Figure 7:
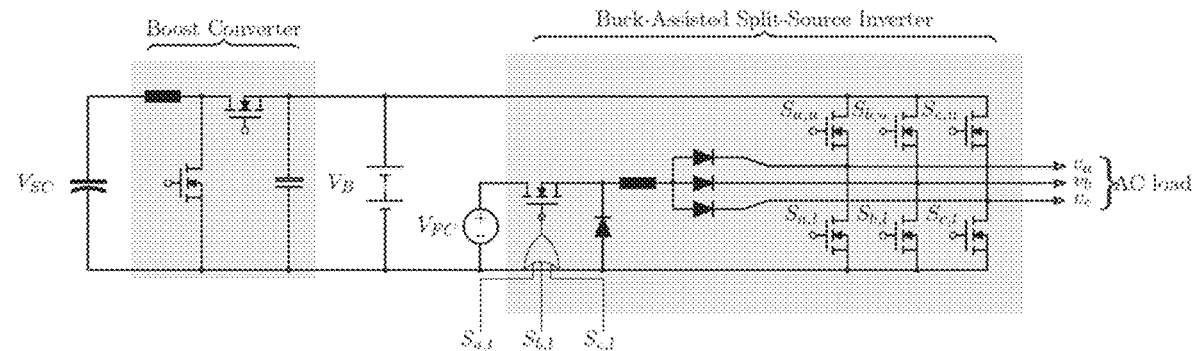

FIG. 7 shows another embodiment of the invention, in which a boost converter is used to control the DC link voltage as in FIG. 6. In FIG. 7 a battery or battery unit with voltage $V_B$ is connected to the output of the boost converter and thereby also to the input of the split-source inverter. A super capacitor with voltage $V_{SC}$ is connected to feed power to the boost converter. In the structure of FIG. 7, fuel cell, batteries and supercapacitors can be integrated with minimal converter requirements.

In the embodiments shown in the FIGS. 3 to 7, the input terminals for the fuel cell are provided such that one of the input terminal is the negative DC link. In such embodiments the first connection point is formed of a negative voltage rail of the DC link, the anodes of the at least two first diodes are connected together and the anode of the second diode being connected to the negative voltage rail of the DC link.

In another embodiment the first connection point is formed of a positive voltage rail of the DC link, the cathodes of the at least two first diodes being connected together and the cathode of the second diode being connected to the positive voltage rail of the DC link. In such an embodiment the fuel cell is adapted to be connected to the positive voltage rail from its positive output. In such a case, the state of the output voltage in which the energy storage of the DC link is charged is when all of the lower semiconductor switches of the inverter bridge are controlled conductive. Further, the inductor is charged and the switch component is controlled conductive when any of the upper switches of the inverter bridge is controlled conductive.

The embodiments of the invention presented in FIGS. 6 and 7 enable to integrate different energy sources to a converter structure. The additional boost converter in the input of the buck-assisted split-source converter may be controlled with different control schemes. The high-level control of the split-source converter and the additional boost converter may be synchronized to take into account the different energy sources used in the structure.

It will be obvious to a person skilled in the art that, as the technology advances, the inventive concept can be implemented in various ways. The invention and its embodiments are not limited to the examples described above but may vary within the scope of the claims.

The invention claimed is:

1. A buck-assisted split-source inverter comprising:
a DC link having two voltage rails;
at least two pairs of series connected switches with antiparallel diodes connected between the voltage rails of the DC link, center points of the series connected switches forming phase outputs of the inverter;
a first connection point and a second connection point for receiving voltage terminals of a fuel cell, one of the two voltage rails forming the first connection point;
a switch component and an inductor connected in series having a first end formed of a terminal of the switch component and a second end formed of a terminal of the inductor, the first end forming the second connection point for receiving a voltage terminal of the fuel cell;
at least two first diodes having one of their corresponding terminals connected together and to the second end of the series connection of the switch component and the inductor, and the other terminals of the at least two first diodes being connected to separate phase outputs of the inverter; and
a second diode having first and second terminals, the first terminal being connected to a point between the switch component and the inductor and the second terminal being connected to the voltage rail forming the first connection point, a polarity of the second diode corresponding to polarities of the at least two first diodes such that a current path is formed through the second diode and the at least two first diodes,
wherein the switch component is adapted to be controlled conductive when any one of the lower switches connected to the voltage rail forming the first connection point is controlled conductive.

2. The buck-assisted split-source inverter of claim 1, wherein the first connection point is formed of a negative voltage rail of the DC link, anodes of the at least two first diodes being connected together and an anode of the second diode being connected to the negative voltage rail of the DC link.

3. The buck-assisted split-source inverter of claim 1, wherein the first connection point is formed of a positive voltage rail of the DC link, cathodes of the at least two first diodes being connected together and a cathode of the second diode being connected to the positive voltage rail of the DC link.

4. The buck-assisted split-source inverter of claim 1, wherein the switch component is adapted to be controlled conductive when any one of the switches connected to the voltage rail forming the first connection point is controlled conductive and when a control signal is active.

5. The buck-assisted split-source inverter of claim 2, wherein the switch component is adapted to be controlled conductive when any one of the switches connected to the voltage rail forming the first connection point is controlled conductive and when a control signal is active.

6. The buck-assisted split-source inverter of claim 3, wherein the switch component is adapted to be controlled conductive when any one of the switches connected to the voltage rail forming the first connection point is controlled conductive and when a control signal is active.

7. The buck-assisted split-source inverter of claim 1, wherein the DC link of the buck-assisted split-source inverter comprises a capacitor connected between the voltage rails of the DC link.

8. The buck-assisted split-source inverter of claim 1, wherein the DC link of the buck-assisted split-source inverter comprises a battery connected between the voltage rails of the DC link.

9. The buck-assisted split-source inverter of claim 1, wherein the buck-assisted split-source inverter comprises a boost converter connected to the DC link, the boost converter receiving power from a battery or a super capacitor.

10. The buck-assisted split-source inverter of claim 9, wherein the DC link comprises a battery connected between the voltage rails of the DC link, wherein the battery is connected to an output of the boost converter.

11. The buck-assisted split-source inverter of claim 1, comprising a fuel cell connected between the first connection point and the second connection point.

12. A buck-assisted split-source converter device comprising:
- a DC link having two voltage rails;
- at least two pairs of series connected controllable semiconductor switches with antiparallel diodes connected between the voltage rails of the DC link, wherein each pair comprises an upper controllable semiconductor switch and a lower controllable semiconductor switch with a center point therebetween, the center points of the series connected controllable semiconductor switches forming phase outputs of the converter device;
- a first connection point and a second connection point configured to receive voltage terminals of a fuel cell, one of the two voltage rails of the DC link forming the first connection point;
- a controllable switch component and an inductor connected in series having a first end formed of a terminal of the controllable switch component and a second end formed of a terminal of the inductor, the first end forming the second connection point for receiving a voltage terminal of the fuel cell;
- at least two first diodes having one of their corresponding terminals connected together and to the second end of the series connection of the controllable switch component and the inductor, and the other terminals of the at least two first diodes being connected to separate phase outputs of the converter device;
- a second diode having first and second terminals, the first terminal being connected to a point between the controllable switch component and the inductor and the second terminal being connected to the voltage rail forming the first connection point, a polarity of the second diode corresponding to polarities of the at least two first diodes such that a current path is formed through the second diode and the at least two first diodes; and
- a circuit configured to control the controllable switch component conductive when any one of the lower controllable semiconductor switches connected to the voltage rail forming the first connection point is controlled conductive.

13. The buck-assisted split-source converter device of claim 12, wherein the first connection point is formed of a negative voltage rail of the DC link, anodes of the at least two first diodes being connected together and an anode of the second diode being connected to the negative voltage rail of the DC link.

14. The buck-assisted split-source converter device of claim 12, wherein the first connection point is formed of a positive voltage rail of the DC link, cathodes of the at least two first diodes being connected together and a cathode of the second diode being connected to the positive voltage rail of the DC link.

15. The buck-assisted split-source converter device of claim 12, comprising a fuel cell connected between the first connection point and the second connection point.

* * * * *